US008967672B2

(12) United States Patent
Kurogi et al.

(10) Patent No.: US 8,967,672 B2
(45) Date of Patent: Mar. 3, 2015

(54) VEHICLE-BODY STRUCTURE OF VEHICLE AND MANUFACTURING METHOD OF THE SAME

(75) Inventors: Osamu Kurogi, Hiroshima (JP); Tsuyoshi Sugihara, Hiroshima (JP); Kohya Nakagawa, Hiroshima (JP); Kuniaki Nagao, Hiroshima (JP); Sakayu Terada, Hiroshima (JP); Miho Kowaki, Hiroshima (JP); Akira Iyoshi, Hiroshima (JP); Shigeaki Watanabe, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 13/600,085

(22) Filed: Aug. 30, 2012

(65) Prior Publication Data

US 2013/0049393 A1   Feb. 28, 2013

(30) Foreign Application Priority Data

Aug. 31, 2011   (JP) .................................. 2011-189062

(51) Int. Cl.
  *B62D 25/20*   (2006.01)
  *B62D 21/11*   (2006.01)
  *B62D 25/08*   (2006.01)

(52) U.S. Cl.
  CPC ............ *B62D 25/2027* (2013.01); *B62D 25/20* (2013.01); *B62D 21/11* (2013.01); *B62D 25/087* (2013.01)
  USPC .......................................... 280/788; 280/798

(58) Field of Classification Search
  CPC .... B62D 21/11; B62D 25/20; B62D 25/2027; B60G 2206/60

USPC .................................................. 280/788, 798
See application file for complete search history.

(56) References Cited

U.S. PATENT DOCUMENTS

| | | | | |
|---|---|---|---|---|
| 3,872,945 A | * | 3/1975 | Hickman et al. | 180/65.6 |
| 4,531,761 A | * | 7/1985 | von Sivers | 280/785 |
| 4,948,156 A | * | 8/1990 | Fortner | 280/304.1 |
| 6,053,519 A | * | 4/2000 | Poindexter et al. | 280/250.1 |
| 6,125,957 A | * | 10/2000 | Kauffmann | 180/65.1 |
| 6,273,844 B1 | * | 8/2001 | Kelsey et al. | 482/54 |
| 6,293,588 B1 | * | 9/2001 | Clune | 280/808 |
| 6,315,138 B1 | * | 11/2001 | Dyson | 212/336 |
| 6,349,953 B1 | * | 2/2002 | Yoshihira et al. | 280/124.109 |
| 6,375,209 B1 | * | 4/2002 | Schlangen | 280/250.1 |
| 6,375,221 B1 | * | 4/2002 | Kudou | 280/788 |

(Continued)

FOREIGN PATENT DOCUMENTS

| | | |
|---|---|---|
| CN | 1640750 A | 7/2005 |
| JP | 59-182472 U | 12/1984 |

(Continued)

*Primary Examiner* — Nicole Verley
(74) *Attorney, Agent, or Firm* — Studebaker & Brackett PC

(57) ABSTRACT

In a vehicle-body structure of a vehicle, where suspension forming members are attached to a vehicle body, there are provided a first face portion, through which the suspension forming member extends, a second face portion provided to face to the first face portion, and a support member provided between the first face portion and the second face portion and supporting the suspension forming members, and the support member is joined to said second face portion via a reinforcing member which is formed integrally with the support member or formed separately from the support member. Accordingly, vibrations of the support member can be properly restrained.

3 Claims, 17 Drawing Sheets

(56) References Cited

U.S. PATENT DOCUMENTS

| | | | |
|---|---|---|---|
| 6,554,747 B1 * | 4/2003 | Rempe | 482/38 |
| 6,659,211 B2 * | 12/2003 | Esposito | 180/65.1 |
| 6,688,414 B1 * | 2/2004 | Bruno | 180/233 |
| 6,869,090 B2 * | 3/2005 | Tatsumi et al. | 280/124.109 |
| 6,926,106 B2 * | 8/2005 | Richey et al. | 180/65.1 |
| 6,997,276 B2 * | 2/2006 | Yoshida et al. | 180/232 |
| 7,237,829 B2 * | 7/2007 | Latimer et al. | 296/187.11 |
| 7,381,163 B2 * | 6/2008 | Gordon et al. | 482/69 |
| 7,393,015 B1 * | 7/2008 | Gillespie et al. | 280/781 |
| 7,494,450 B2 * | 2/2009 | Solomon | 482/69 |
| 7,513,329 B2 * | 4/2009 | Nakashima et al. | 180/312 |
| 7,624,826 B2 * | 12/2009 | Zhao | 180/6.5 |
| 7,784,858 B2 * | 8/2010 | Abe et al. | 296/203.04 |
| 7,828,330 B2 * | 11/2010 | Tamura et al. | 280/788 |
| 7,882,909 B2 * | 2/2011 | Pearlman et al. | 180/23 |
| 8,104,554 B2 * | 1/2012 | Graham | 180/65.1 |
| 8,128,120 B2 * | 3/2012 | Porcheron | 280/657 |
| 8,172,015 B2 * | 5/2012 | Molnar | 180/65.1 |
| 8,172,023 B1 * | 5/2012 | Irvine | 180/208 |
| 8,177,257 B2 * | 5/2012 | Dugas et al. | 280/755 |
| 8,181,992 B2 * | 5/2012 | Mulhern et al. | 280/755 |
| 8,490,988 B2 * | 7/2013 | Takeshita et al. | 280/124.109 |
| 8,505,657 B2 * | 8/2013 | Gong | 180/65.1 |
| 8,522,907 B1 * | 9/2013 | Irvine | 180/208 |
| 2001/0022437 A1 * | 9/2001 | Suzuki | 280/124.134 |
| 2002/0065173 A1 * | 5/2002 | Cook | 482/69 |
| 2004/0143198 A1 * | 7/2004 | West | 601/5 |
| 2005/0093286 A1 * | 5/2005 | Oh | 280/788 |
| 2005/0250624 A1 * | 11/2005 | Yu | 482/69 |
| 2006/0017263 A1 * | 1/2006 | Chen et al. | 280/647 |
| 2006/0267304 A1 * | 11/2006 | Park et al. | 280/124.109 |
| 2007/0024044 A1 * | 2/2007 | Ogawa et al. | 280/788 |
| 2009/0058135 A1 * | 3/2009 | Murata et al. | 296/187.09 |
| 2010/0237215 A1 * | 9/2010 | Dahl | 248/419 |
| 2013/0137553 A1 * | 5/2013 | Kim et al. | 482/69 |
| 2013/0324379 A1 * | 12/2013 | Zondervan et al. | 482/130 |

FOREIGN PATENT DOCUMENTS

| | | | | | |
|---|---|---|---|---|---|
| JP | 60-097673 | U | | 7/1985 | |
| JP | 04090975 | A | * | 3/1992 | B62D 21/11 |
| JP | 04095586 | A | * | 3/1992 | B62D 21/11 |
| JP | 04297375 | A | * | 10/1992 | B62D 21/02 |
| JP | 2001-048050 | A | | 2/2001 | |
| JP | 2005-199918 | A | | 7/2005 | |
| JP | 2006-306135 | A | | 11/2006 | |
| JP | 2011-201425 | A | | 10/2011 | |
| JP | 2011-255815 | A | | 12/2011 | |
| JP | 2012-017084 | A | | 1/2012 | |
| WO | WO 9008669 | A1 | * | 8/1990 | A61G 5/00 |

* cited by examiner

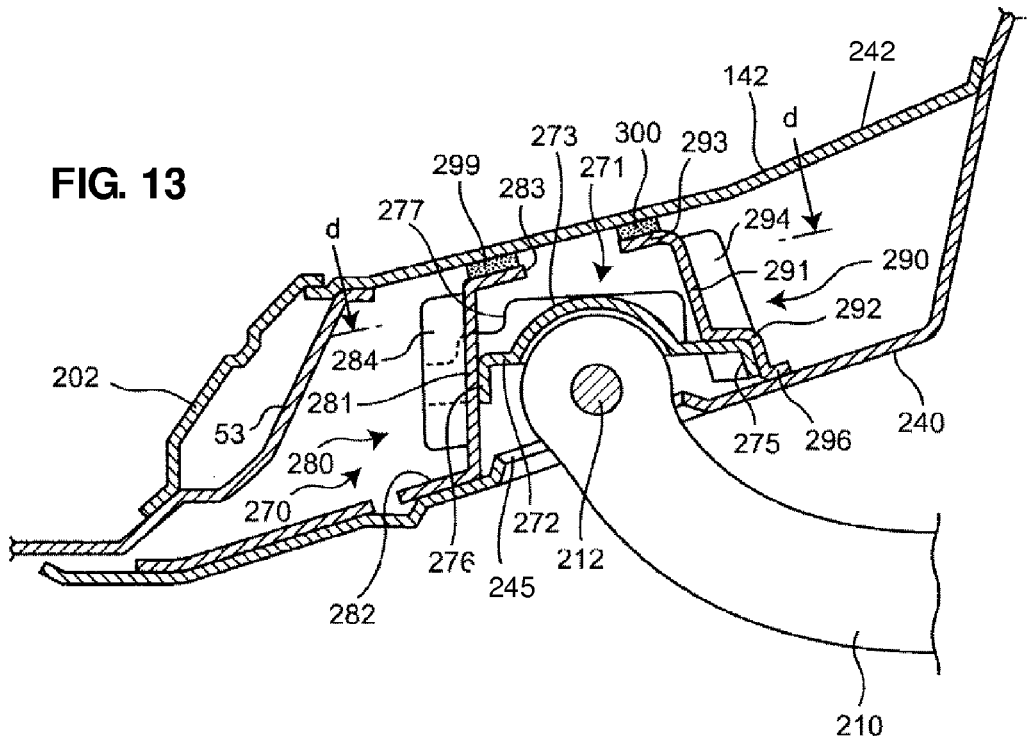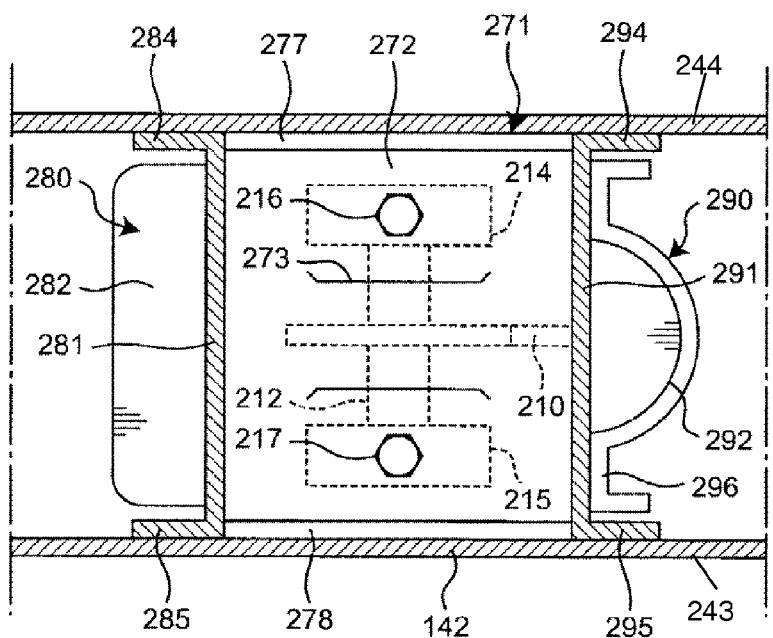

VEHICLE-BODY STRUCTURE OF VEHICLE AND MANUFACTURING METHOD OF THE SAME

BACKGROUND OF THE INVENTION

The present invention relates to a vehicle-body structure of a vehicle, and in particular to a vehicle-body structure of a vehicle, in which a suspension forming member is supported by a support member provided between a first face portion the suspension forming member penetrates and a second face portion provided to face to the first face portion, and a manufacturing method of the same.

As a structure to support various members forming part of a suspension device, such as a bolt and nut or a trailing arm, (hereinafter, referred to as "suspension forming member"), a specified structure, in which the suspension forming member is provided to vertically penetrate a plate-shaped member which is arranged substantially horizontally and forms various frames or brackets, and this suspension forming member is supported by a support member which is fixed to the plate-shaped member such that the suspension forming member is positioned above the plate-shaped member with a space, is applied to vehicles, such as automotive vehicles, in some cases.

Japanese Patent Laid-Open publication No. 2001-048050, for example, discloses the structure, referring to FIG. 3, in which the bolt for fixing the rear end portion of the sub frame is provided to penetrate the bottom face portion of the outrigger which is arranged below the boarder portion of the floor panel and the dash panel and fixed to the lower faces of these panels, and this bolt is supported at the upper-and-lower two points of the support member and the penetration portion of the outrigger. Herein, the support member is fixed to the outrigger such that it is provided above the bottom face portion of the outrigger and below the dash panel. According to the technology of the above-described publication, by utilizing the space between the outrigger and the dash panel, the bolt for fixing the sub frame can be positioned at an appropriate level for the suspension device and also supported stably at the above-described upper-and-lower two points.

Further, Japanese Patent Laid-Open publication No. 2006-306135 discloses the structure, referring to FIG. 5, in which the bolt for attaching the suspension cross member is provided to penetrate the bottom face portion of the side frame which is fixed to the lower faces of the floor panel, and this bolt is supported at the upper-and-lower two points of the support member and the penetration portion of the side framer. Herein, the support member is fixed to the side frame such that it is provided above the bottom face portion of the side frame and below the floor panel. According to the technology of the above-described publication, by utilizing the space between the side frame and the floor panel, the bolt for attaching the suspension cross member can be positioned at an appropriate level for the suspension device and also supported stably at the above-described upper-and-lower two points.

However, in a case in which the support member to support the suspension forming member is provided between the first plate-shaped member penetrating the suspension forming member and the second plate-shaped member facing to the first plate-shaped member like the technologies of the above-described publications, there is problem in that the support member joined to the suspension forming member may be easily made vibrate due to the vibration transmission from the suspension device.

SUMMARY OF THE INVENTION

An object of the present invention is to provide a vehicle-body structure of a vehicle or a manufacturing method of the same which can properly restrain vibrations of the support member in the case in which the suspension forming member is supported by the support member provided between the first plate-shaped member penetrating the suspension forming member and the second plate-shaped member facing to the first plate-shaped member.

According to the present invention, there is provided a vehicle-body structure of a vehicle, where a suspension forming member is attached to a vehicle body, comprising a first face portion, which the suspension forming member penetrates, a second face portion provided to face to the first face portion, and a support member provided between the first face portion and the second face portion and supporting the suspension forming member, wherein the support member is joined to the second face portion via a reinforcing member which is formed integrally with the support member or formed separately from the support member.

According to the present invention, since the support member is joined to the second face portion via the reinforcing member in the case in which the suspension forming member is supported by the support member provided between the first plate-shaped member penetrating the suspension forming member and the second plate-shaped member facing to the first plate-shaped member, move of the support member is restricted by the second face portion, so that vibrations of the support member can be properly restrained.

According to an embodiment of the present invention, the support member is joined to the first face portion. Thereby, vibrations of the support member can be effectively restrained.

According to another embodiment of the present invention, the vehicle-body structure of a vehicle further comprises at least one third face portion forming a closed section together with the first and second face portions by connecting the first face portion and the second face portion, wherein at least one of the support member and the reinforcing member is joined the third face portion. Thereby, the move of the support member is restricted by the third face portion as well, so that the vibrations of the support member can be further effectively restrained.

According to another embodiment of the present invention, a joint portion of the reinforcing member and another member than the reinforcing member includes a rigid joint portion where the reinforcing member and another member are joined with a direct contact thereof and a flexible joint portion where the reinforcing member and another member are joined via a damping member provided therebetween. Thereby, the reinforcing member and the other member can be joined firmly with the rigid joint portion, thereby ensuring the rigidity-improvement effect can be ensured, and also the vibrations of the reinforcing member and the support member can be reduced with the flexible joint portion. Accordingly, the desired rigidity of the vehicle-body structure is ensured and the vibration transmission is restrained, so that the comfortable ride of a vehicle can be improved and the noises can be reduced. Herein, it may not be required to provide any additional member to restrain the vibration transmission, so that the above-described effects can be advantageously provided, avoiding any improper weight increase of the vehicle body or the like.

According to another embodiment of the present invention, the flexible joint portion is provided at a joint portion of the reinforcing member and the second face portion. Thereby, the strain energy converging at the reinforcing member can be effectively reduced, so that the vibrations of the support member and the reinforcing member can be effectively reduced.

According to another embodiment of the present invention, the damping member is a viscoelastic member having physical properties which fall within a range enclosed by six coordinate points: (1, 0.4), (1, 0.2), (2, 0.1), (1000, 0.1), (10000, 0.2) and (10000, 0.4) in an X-Y coordinate system with X axis of the storage modulus and Y axis of the loss factor, or a range exceeding the loss factor of 0.4. Thereby, since the viscoelastic member is used as the damping member and the storage modulus and the loss factor as its physical properties are specified as any values falling within the specified range which has been confirmed as an effective range capable of providing the vibration-damping effect, the above-described damping effect of vibrations of the reinforcing member and the support member can be surely provided.

According to anther aspect of the present invention, there is provided a manufacturing method of a vehicle-body structure of a vehicle, where a suspension forming member is attached to a vehicle body, the vehicle-body structure comprising a first face portion, through which the suspension forming member extends, a second face portion provided to face to the first face portion, and a support member provided between the first face portion and the second face portion and supporting the suspension forming member, wherein the support member is joined to the second face portion via a reinforcing member which is formed integrally with the support member or formed separately from the support member. A vehicle-body structure of a vehicle manufactured by this method can provide the same effects described above for the present invention.

Other features, aspects, and advantages of the present invention will become apparent from the following description which refers to the accompanying drawings.

BRIEF DESCRIPTION OF THE DRAWINGS

FIG. 13 is a sectional view of the vehicle-body structure according to the third embodiment taken along line c-c of FIG. 12.

FIG. 14 is a sectional view of the vehicle-body structure according to the third embodiment taken along line d-d of FIG. 13.

DETAILED DESCRIPTION OF THE INVENTION

Hereinafter, preferred embodiments of the present invention will be described referring to the accompanying drawings.

At first, results of simulation conducted to the structures specified in claims of the present invention will be described prior to descriptions of specific applicable structures to a vehicle body.

Figure 1:
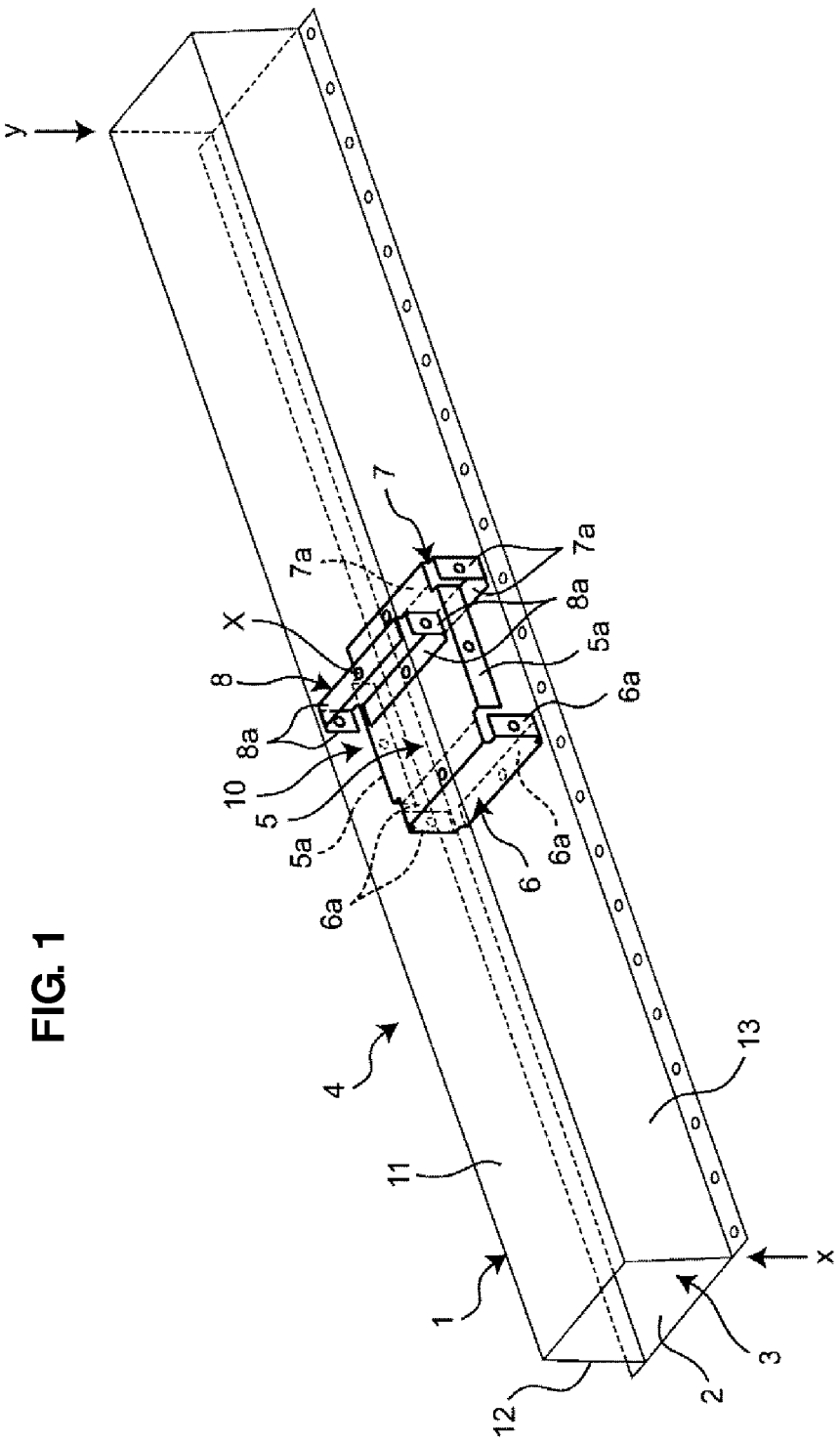
FIG. 1 is a diagram showing a rigid joint model A used for a simulation of an embodiment of the present invention.
Figure 2:
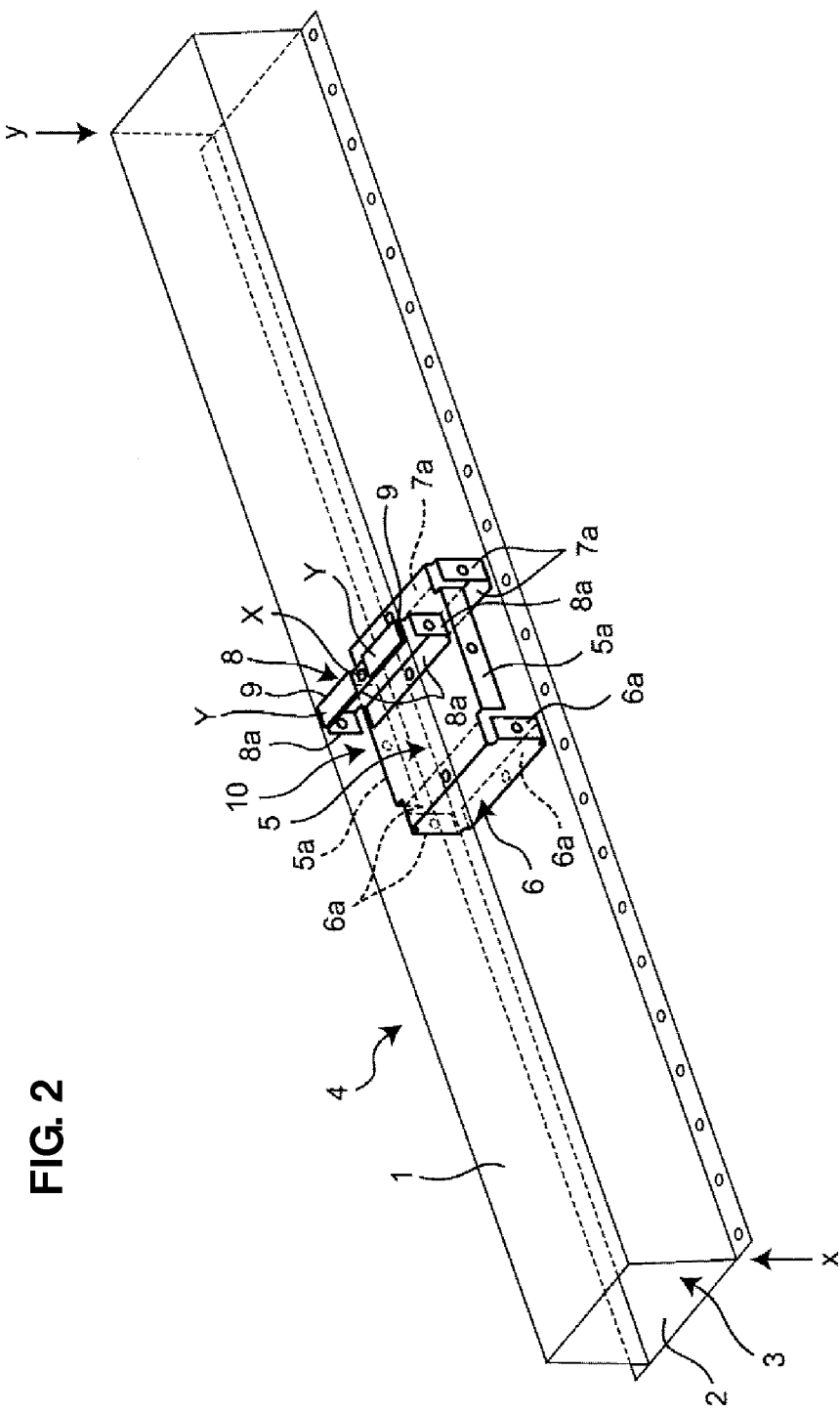
FIG. 2 is a diagram showing a rigid-flexible combined joint model B used for the simulation.

FIG. 1 is a diagram showing a rigid joint model A used for this simulation, and FIG. 2 is a diagram showing a rigid-flexible combined joint model B used for this simulation. In each model, a first member 1 which has a U-shaped section and a second member 2 which has a plate shape are used as a vehicle-body forming member, which form a hollow frame 4 having a closed-section portion 3 with a rectangular section by joining both-side flanges of the first member 1 to both-side end portion of the second member 2. The closed-section portion 3 of the hollow frame 4 is formed by a first face portion which is comprised of the second member 2, a second face portion which is comprised of an upper face portion 11 of the first member 1 and provided to face to the first face portion, and a pair of third face portions which is comprised of side face portions 12, 13 of the first member 1 and connects the first face portion and the second face portion.

Further, in each of the models A, B, a support member 10 to support a suspension forming member, not illustrated, is provided between the first face portion 2 and the second face portion 11, and this support member 10 is joined to the second face portion 11 via a reinforcing member 8. The support member 10 comprises an upper face portion 5 which has a rectangular-plate shape and is provided above and facing to the first face portion 2, and a pair of leg portions 6, 7 which has a rectangular-plate shape and is provided to extend downward from both ends, in a longitudinal length of the hollow frame 4, of the upper face portion 5. The leg portions 6, 7 have flanges 6a, 7a at respective sides of their peripheries. The upper flanges 6a, 7a are joined to the upper face portion 5, the lower flanges 6a, 7a are joined to the first face portion 2, and the side flanges 6a, 7a are joined to the third face portions 12, 13, respectively. The reinforcing member 8 is a member which has a rectangular plate shape and is provided perpendicularly to the upper face portion 5 of the support member 10, and this reinforcing member 8 has flanges 8a at respective sides of its periphery. The upper flange 8a is joined to the second face portion 11, the lower flange 8a is joined to the upper face portion 5 of the support member 10, and the side flange 8a is joined to the third face portions 12, 13, respectively.

In the rigid joint model A shown in FIG. 1, the reinforcing member 8 is joined to the upper face portion 5 of the support member 10, the third face portions 12, 13, and the second face portion 11 by spot welding. Meanwhile, in the rigid-flexible combined joint model B shown in FIG. 2, the reinforcing member 8 is joined to the upper face portion 5 of the support member 10 and the third face portions 12, 13 only by spot welding, but the reinforcing member 8 is joined to the second face portion 11 by combination of rigid and flexible joining. Specifically, the upper flange 8a of the reinforcing member 8 is joined to the second face portion 11 at its central portion by spot welding and also at its both sides via damping members 9. Herein, the above-described joint portion with the spot welding constitutes a rigid joint portion X and the above-described joint portion via the damping member 9 constitutes a flexible joint portion Y.

Herein, while the model B equipped with both the rigid joint portion X and the flexible joint portion Y has a higher rigidity than the model A equipped with only the rigid joint portion X and therefore there exists a difference in the resonance frequency between the models A, B, in order to compare these models properly by making their resonance frequency uniform, the area of the rigid joint portion X of the model A is set to be slightly larger than that of the rigid joint portion X of the model B. Further, the damping member 9 provided at the flexible joint portion Y is comprised of a viscoelastic member which has the loss factor of 0.4 and the storage modulus of 200 MPa (20° C., 30 Hz).

Figure 3:
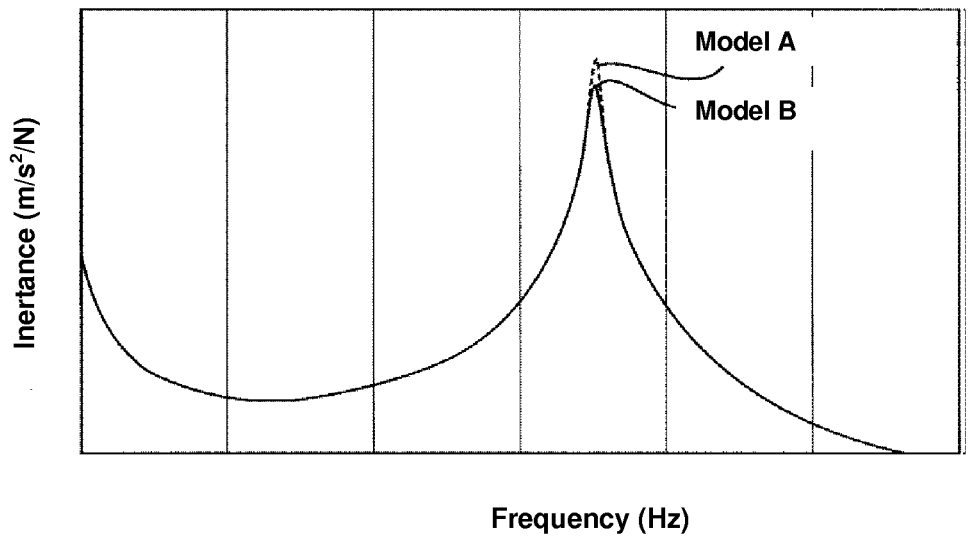
FIG. 3 is a characteristic graph of the inertance for the frequency, which shows results of the simulation.

FIG. 3 shows simulation results, which shows a comparison of the respective inertance at a responsive point y (a magnitude of an acceleration amplitude per an exciting force: $m/s^2/N$), in which in each of the models A, B, a specified corner portion of the closed-section portion 3 at one end of the frame 4 is set as an exciting point x and another corner portion of the closed-section face 3 which is located diagonally to the other end of the frame 4 is set as the responsive point y.

As apparent from this figure, a peak value of the inertance of the rigid-flexible combined joint model B is lower than that of the rigid joint model A. Accordingly, it is shown that the amount of damping occurring in the process of vibration transmission from the exciting point x to the responsive point y becomes greater by providing the flexible joint portion Y.

Figure 4:
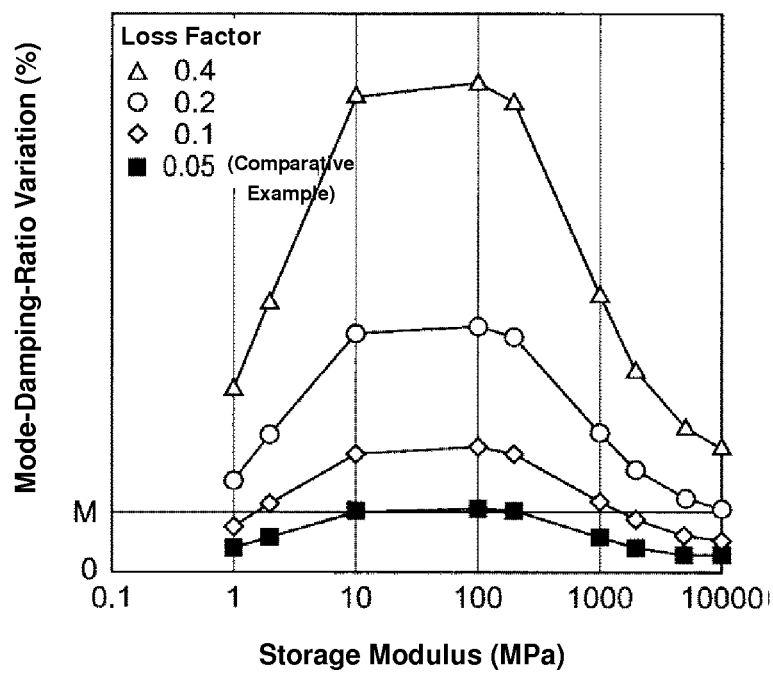
FIG. 4 is a characteristic graph of the mode-damping-ratio variation for the storage modulus, which shows results of the simulation.

FIG. 4 shows simulation results of a mode-damping-ratio variation characteristic for the storage modulus and the loss factor when using plural viscoelastic members having different values of the loss factor as the damping member 9 in the above-described rigid-flexible combined joint model B. Herein, the damping member having the loss factor of 0.05 is a comparative sample, which is an adhesive agent for structure generally used in the vehicle body.

As apparent from this figure, it is shown that the mode-damping-ratio variation in a case of using the viscoelastic member is greater than that in a case of using the general adhesive agent for structure (the loss factor of 0.05) in a whole area of the storage modulus, thereby damping the vibration more easily. In particular, it is shown that the mode-damping-ratio variation becomes greater as the loss factor becomes greater, and that the mode-damping-ratio variation becomes the maximum when the storage modulus is 100 MPa regardless of the value of the loss factor.

Figure 5:
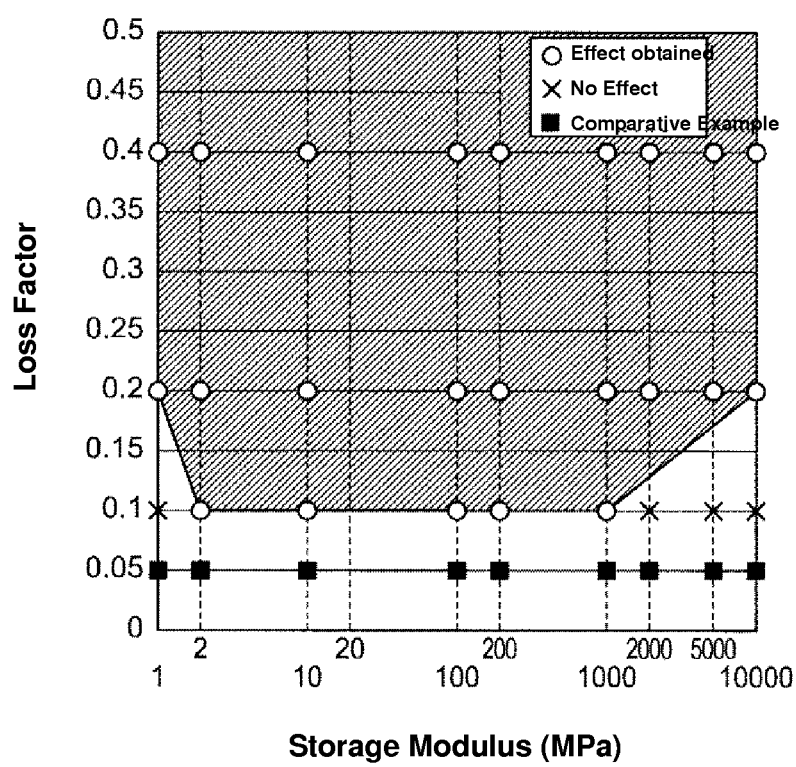
FIG. 5 is a graph showing an effective scope which is created based on the results of FIG. 4.

FIG. 5 shows relationships between the loss factor and the storage modulus which can substantially obtain the damping effect in a case in which the viscoelastic member is used as the damping member 9 from the simulation results of FIG. 4. In this figure, it is determined that the effect can be obtained in a case in which the mode-damping-ratio variation is a threshold M or greater which is shown in FIG. 4, while no effect can be obtained in a case in which the mode-damping-ratio variation is less than the threshold M.

Consequently, it has been found out that the damping effect can be obtained in substantially a range enclosed by six coordinate points: (1, 0.4), (1, 0.2), (2, 0.1), (1000, 0.1), (10000, 0.2) and (10000, 0.4) in an X-Y coordinate system with X axis of the storage modulus and Y axis of the loss factor, and a range exceeding the loss factor of 0.4.

Next, preferred embodiments in which the structure of the present invention is applied to the vehicle body will be described. In the descriptions below, terms showing directions, such as "forward," "rearward," "longitudinal," "right," "left" and "right and left," will generally indicate respective directions when the vehicle's advance direction is considered as the "forward" direction.

Figure 6:
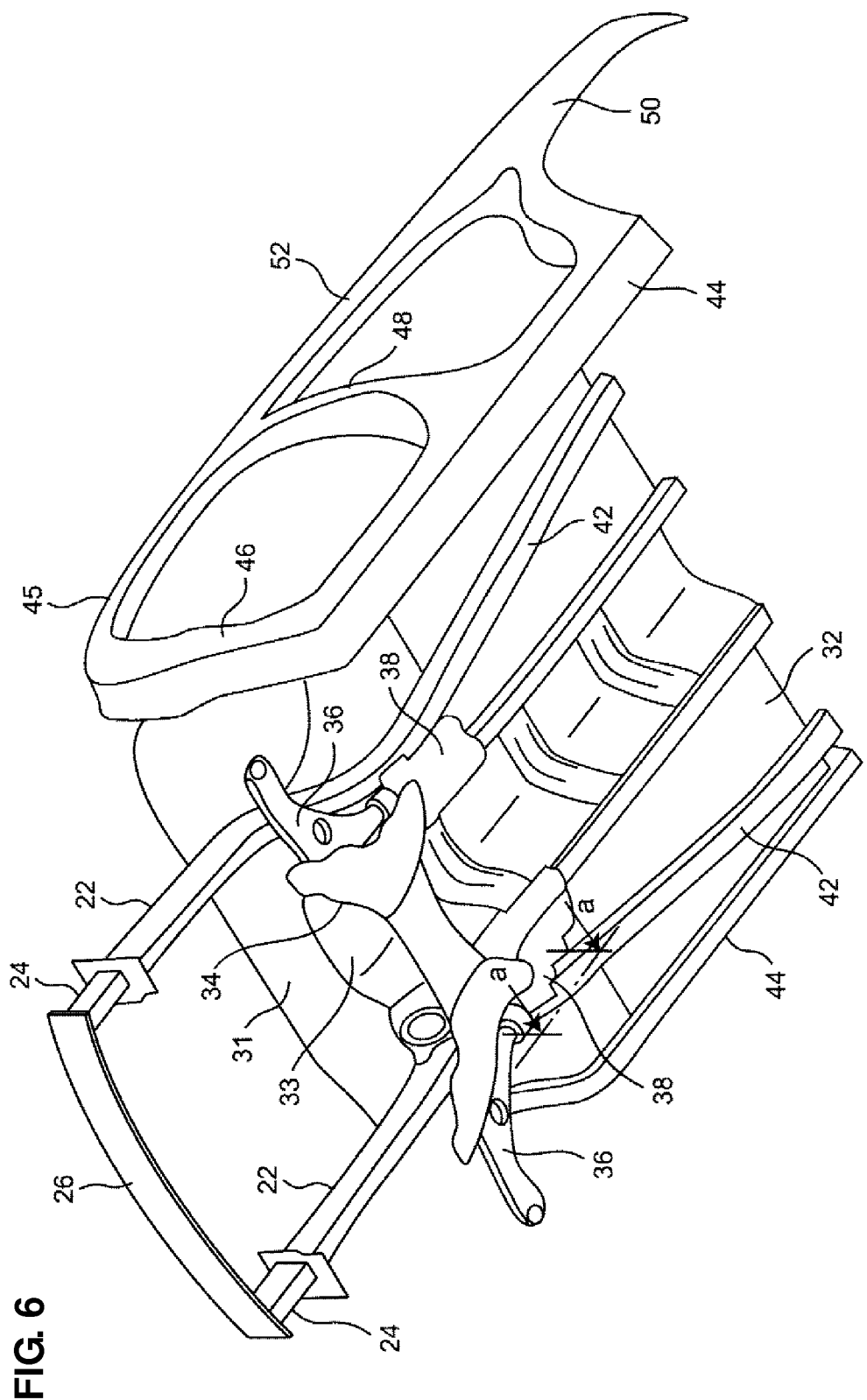
FIG. 6 is a perspective view showing a vehicle body to which a first embodiment of the present invention is applied.

FIG. 6 is a perspective view of a structure of a vehicle body to which a first embodiments is applied, when viewed obliquely from the front and below. As shown in FIG. 6, as members forming a framework of a front portion of the vehicle body around an engine room, there are provided a right-and-left front side frames 22 which extend longitudinally, bumper stays 24 which extend forward from respective front end portions of the front side frames 22, a bumper reinforcement 26 which is connected to respective front end portions of the bumper stay 24 at its both end portions and extends in a vehicle width direction, and a front-suspension cross member 34 which is provided to extend in the vehicle width direction in back of the bumper reinforcement 26. Right-and-left lower arms 36, part of a suspension device of front wheels, are arranged near right-and-left end portions of the front suspension cross member 34.

Further, behind the engine room is provided a dash panel 31 which partitions the engine room from a vehicle compartment. A floor panel 32 extends rearward from a lower end of the dash panel 31. Side sills 44 extend longitudinally at right-and-left both side portions of the floor panel 32. Meanwhile, at upper portions of right-and-left both side portions of the vehicle body are provided roof rails 52 to extend longitudinally. Further, front pillars 45, hinge pillars 46, center pillars 48, and rear wheel houses 50 are provided between the roof rails 52 and the side sills 44.

A tunnel reinforcement 33 which extends rearward from the dash panel 31 is arranged at a central portion, in the vehicle width direction, of the floor panel 32. Between the front-and-left side sills 44 and the tunnel reinforcement 33 are respectively provided front floor frames 42 which extend rearward from rear end portions of the front side frames 22. Respective lower-arm brackets 38 are attached to a lower face of the floor panel 32, extending between the tunnel reinforcement 33 and the right-and-left front floor frames 42. Rear end portions of the lower arms 36 are fixed to the lower-arm brackets 38.

Figure 7:
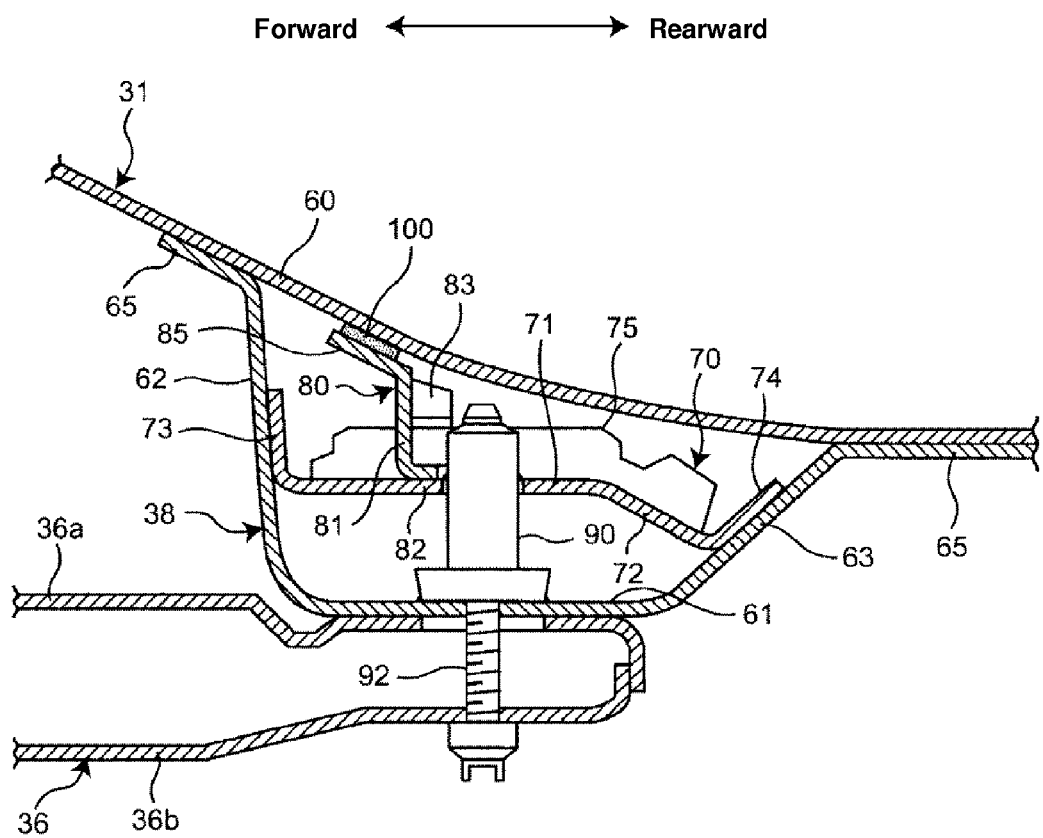
FIG. 7 is a sectional view of a vehicle-body structure according to the first embodiment taken along line a-a of FIG. 6.
Figure 8:
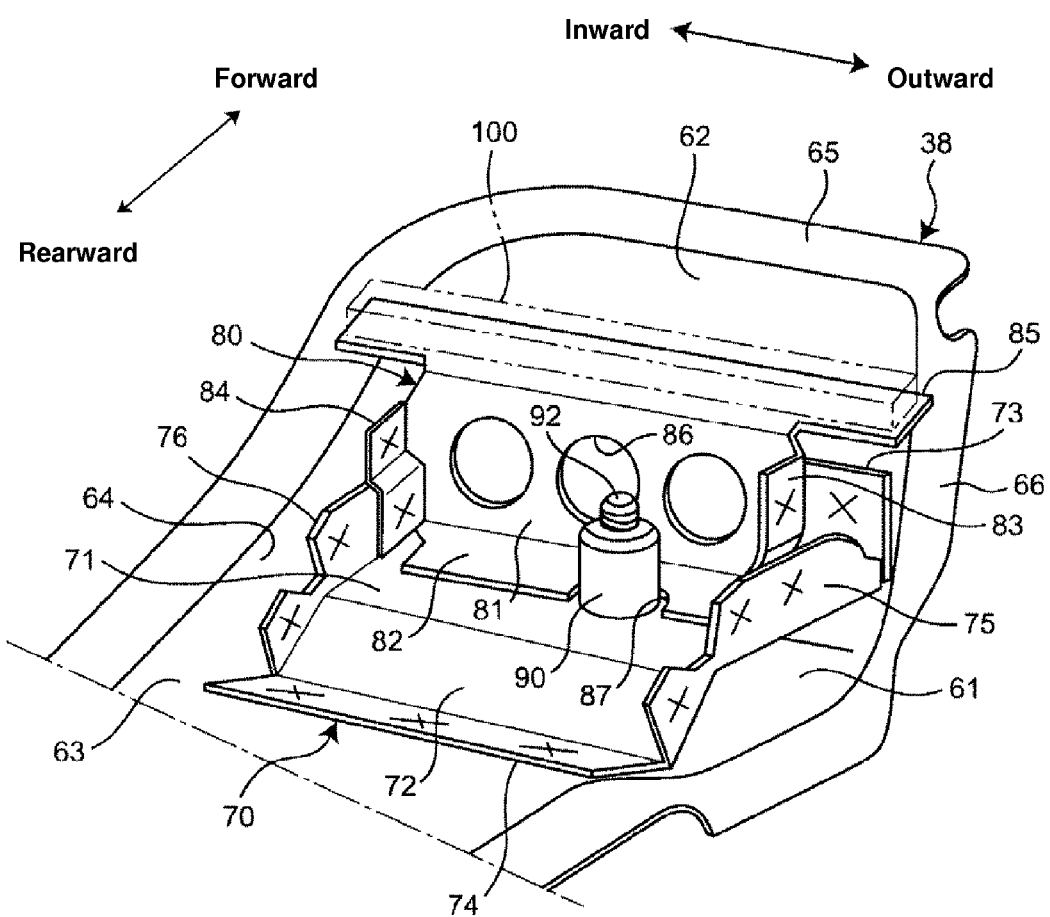
FIG. 8 is a perspective view showing the vehicle-body structure shown in FIG. 7.

FIG. 7 is a sectional view of the lower-arm bracket 38 and its surrounding structure taken along line a-a of FIG. 6, and FIG. 8 is a perspective view of the structure shown in FIG. 7, when viewed obliquely from the rear and above. Herein, while FIGS. 7 and 8 show the right lower-arm bracket 38 and its surrounding structure, the left lower-arm bracket 38 and its surrounding structure have the same constitution. In FIG. 8, a mark x shows a spot-welding portion, which is the same in other figures as well.

As shown in FIGS. 7 and 8, the lower-arm bracket 38 comprises a bottom face portion 61 which is provided below the dash panel 31 with a specified distance, a front face portion 62 which rises toward the dash panel 31 from a front end of the bottom face portion 61, a rear face portion 63 which rises toward the dash panel 31 from a rear end of the bottom face portion 61, and a side wall portion 64 which rises toward the dash panel 31 from an inside end portion, in the vehicle width direction, of the bottom face portion 61. Further, the lower-arm bracket 38 includes a flange 65 which extends along respective upper edge portions of the front face portion 62, the side wall portion 64 and the rear face portion 63. This flange 65 is joined to a lower face of the dash panel 31.

Further, as shown in FIG. 8, the lower-arm bracket 38 has an open shape which opens outward in the vehicle width direction. An open face of the lower-arm bracket 38 is covered with a side face of the front floor frame 42, and a closed section is formed by the side face of the front floor frame 42, the dash panel 31, and the side wall portion 64 and the bottom face portion 61 of the lower-arm bracket 38. Herein, the lower-arm bracket 38 further includes a flange 66 which extends from an outside end portion, in the vehicle width direction, of the front face portion 62 to an outside end portion, in the vehicle width direction, of the bottom face portion 61. This flange 66 is joined to the front floor frame 42.

As shown in FIG. 7, a rear end portion of the lower arm 36 includes a side upper member 36a and a side lower member 36b which is provided below and facing to the side upper member 36a and joined to the side upper member 36a. The side upper member 36a and the side lower member 36b are fixed to the lower-arm bracket 38 by a nut 90 joined to an upper face of the bottom face portion 61 of the lower-arm bracket 38 by welding and a bolt 92 penetrating the side lower member 36b, the side upper member 36a and the bottom face portion 61 of the lower-arm bracket 38 from below.

A support member 70 to support the above-described bolt 92 is provided between the bottom face portion 61 of the lower-arm bracket 38 as the first face portion which the bolt 92 penetrates and the dash panel 31 as the second face portion provided above and facing to the bottom face portion 61.

As shown in FIGS. 7 and 8, the support member 70 comprises a support portion 71 which is provided above and facing to the bottom face portion 61 of the lower-arm bracket 38 and supports the bolt 92 via the nut 90, a slant portion 72 which extends obliquely rearward and downward from a rear end of the support portion 71, a front flange 73 which rises from a front end of the support portion 71, a rear flange 74 which rises from a rear end of the slant portion 72, and a pair of side flanges 75, 76 which rises from both ends, in the vehicle width direction, of the support portion 71 and the slant portion 72. The nut 90 penetrates the support portion 71 and is joined to this support portion 71 by welding. The front flange 73 is joined to the front face portion 62 of the lower-arm bracket 38, the rear flange 74 is joined to the rear face portion 63 of the lower-arm bracket 38, the inside side flange 76 is joined to the side wall portion 64 of the lower-arm bracket 38, and the outside side flange 75 is joined to a side face of the front floor frame 42, respectively, by welding.

The support member 70 is joined to the lower face of the dash panel 31 via the reinforcing member 80, so that move of the support member 70 is restricted. Thereby, vibrations of the support member 70 can be effectively restrained.

The reinforcing member 80 comprises a base portion 82 which is joined to an upper face of the support portion 71 of the support member 70, a rising portion 81 which rises toward the dash panel 31 from a front end of the base portion 82, and a joined portion 85 which extends forward from an upper end of the rising portion 81 and is joined to the lower face of the dash panel 31. The reinforcing member 80 further includes a pair of side flanges 83, 84 which extends rearward from both ends, in the vehicle width direction, of the rising portion 82.

An upper half portion of the inside side flange 84 is joined to the side wall portion 64 of the lower-arm bracket 38, and a lower half portion of the inside side flange 84 is joined to the side flange 76 of the support member 70, respectively. An upper half portion of the outside side flange 83 is joined to a side face of the front floor frame 42, and a lower half portion of the outside side flange 83 is joined to the side flange 75 of the support member 70, respectively.

Herein, plural opening portions 86 are formed at the rising portion 81 for lightweight achievement, and a notch 87 is formed at the base portion 82 for interference avoidance with the nut 90.

A spot-welding joining is applied to a joint portion of the reinforcing member 80 to the support portion 71 of the support member 70 at the base portion 82, a joint portion of the reinforcing member 80 to the side wall portion 64 of the lower-arm bracket 38 and the side flange 76 of the support member 70 at the inside side flange 84, and a joint portion of the reinforcing member 80 to the side face of the front floor frame 42 and the side flange 75 of the support member 70 at the outside side flange 83. These welding portions constitute rigid joint portions X having a direct contact.

Meanwhile, a joining via a viscoelastic member 100 as a vibration damping member is applied to the other joint portion of the reinforcing member 80 to the dash panel 31 at the joined portion 85. This joint portion constitutes a flexible joint portion Y.

The viscoelastic member 100 generates (stores) the strain energy and transfers the strain energy to the thermal energy, whereby the strain energy can be dispersed. Thus, the viscoelastic member 100 can reduce the vibrations. While this viscoelastic member 100 can be joined to the both joint faces by an adhesive agent or its own viscosity, it may be joined by coating. Further, the viscoelastic member 100 is preferably placed between the both joint face portions in its compressive state, whereby a high pressing force against the both joint face portions can be obtained. A material of the viscoelastic member 100 is not limited to a particular one, but a silicon-based material or an acryl-based material, for example, can be used. Herein, the constitution of the viscoelastic member 100 described in this paragraph is applicable to all other vibration reduction members than the viscoelastic member 100 described in this specification, and hereinafter the similar descriptions are omitted.

According to the vehicle-body structure of the first embodiment, since the reinforcing member 80 is provided as described above, any deformation or collapse of the support member 70 and the lower-arm bracket 38, and the like can be restrained with the above-described rigid joint portions X. Further, vibrations transmitted from the bolt 92 and the nut 90 as the suspension forming member to the dash panel 31 via the support member 70 and the reinforcing member 80 can be reduced with the flexible joint portions Y, thereby restraining the vibration transmission to passengers in the vehicle compartment.

Moreover, according to the first embodiment, since the flexible joint portion Y with the viscoelastic member 100 is applied to the joint portion to the dash panel 31 provided above the reinforcing member 80, rusting can be prevented more properly compared with a case in which the flexible joint portion Y is provided below the support member 70.

A second embodiment of the present invention will be described referring to FIGS. 9 through 11. Herein, the same members as those of the above-described first embodiment are denoted by the same numeral references in FIGS. 9 through 11, descriptions of which are omitted here.

Figure 9:
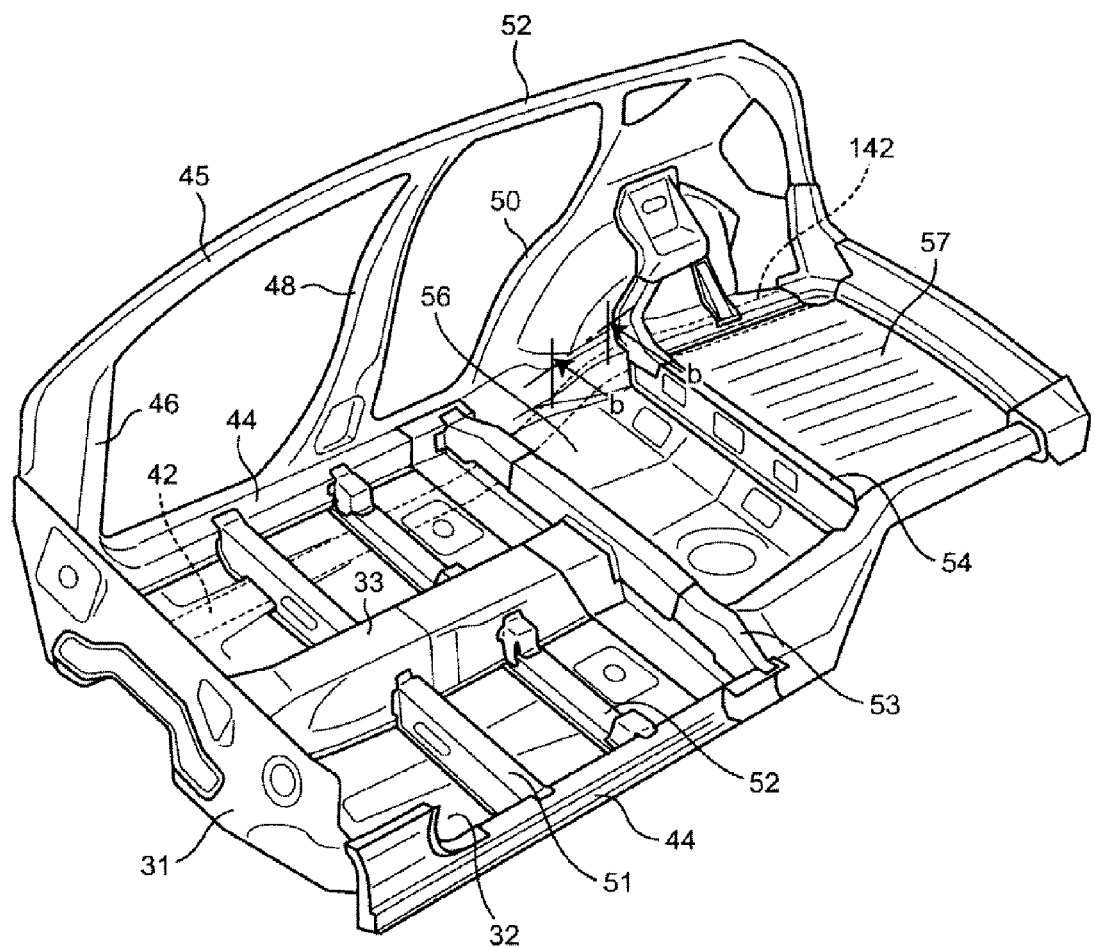
FIG. 9 is a perspective view showing a vehicle body to which a second embodiment of the present invention is applied.

FIG. 9 shows a structure of the vehicle body to which the second embodiment is applied. As shown in FIG. 9, a front portion of the vehicle compartment is formed by the dash panel 31, and a bottom portion of that is formed by the floor panel 32. In a rear portion of the vehicle compartment, a bottom portion is formed by a center floor pan 56 which is continuous to the floor panel 32, and a trunk floor pan 57 is provided in back of the center floor pan 56 to rise stepwise.

Further, between the right-and-left side sills 44 and the tunnel reinforcement 33 are provided a No. 2 cross member 51 and a No. 2.5 cross member 52 which extend in the vehicle width direction, respectively. Additionally, a No. 3 cross member 53 is provided at a border of the floor panel 32 and the center floor panel 56, and a No. 4 cross member 54 is provided at a border of the center floor panel 56 and trunk floor pan 57.

Moreover, rear side frames 142 are respectively provided to extend rearward from rear end portions of the front floor frames 42 at both end portions of the rear portion of the vehicle body.

Figure 10:
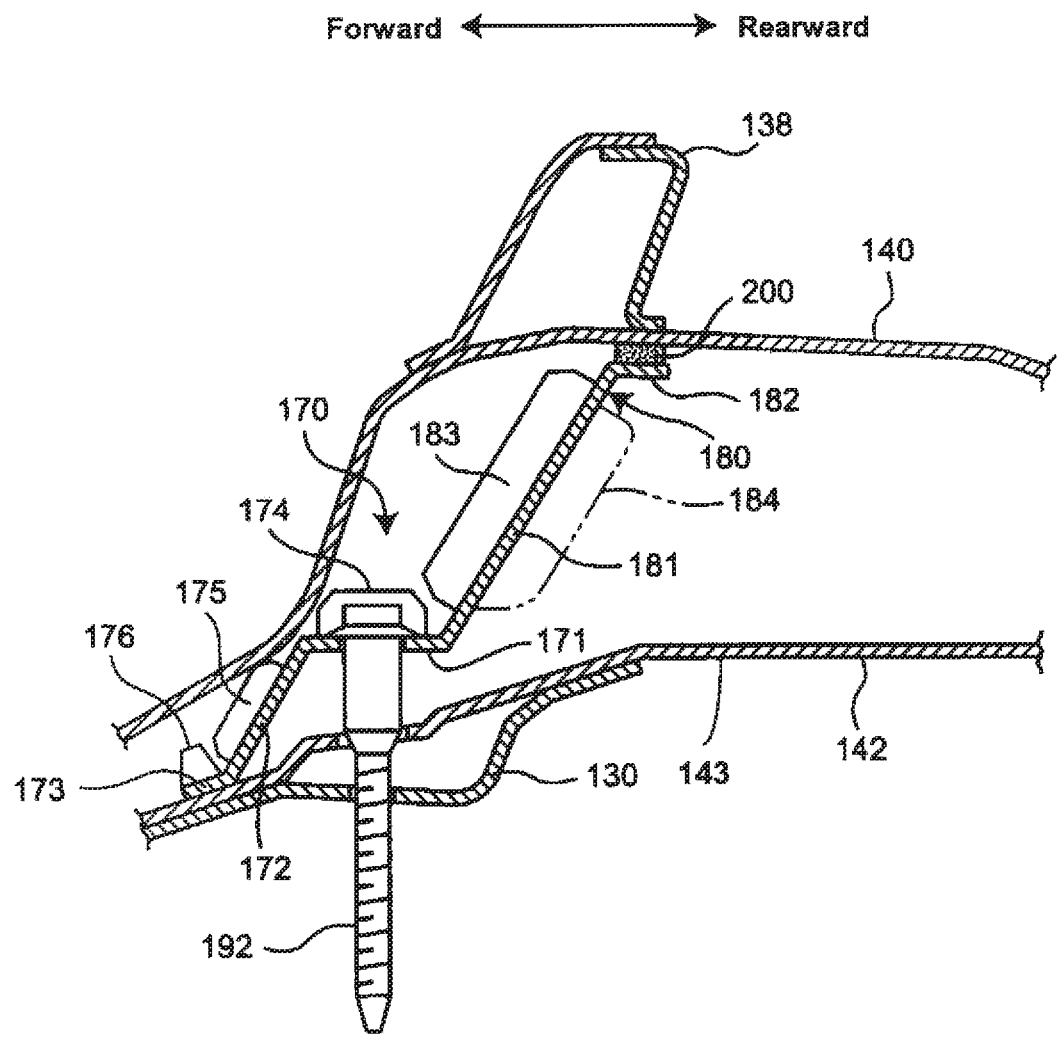
FIG. 10 is a sectional view of the vehicle-body structure according to the second embodiment taken along line b-b of FIG. 9.
Figure 11:
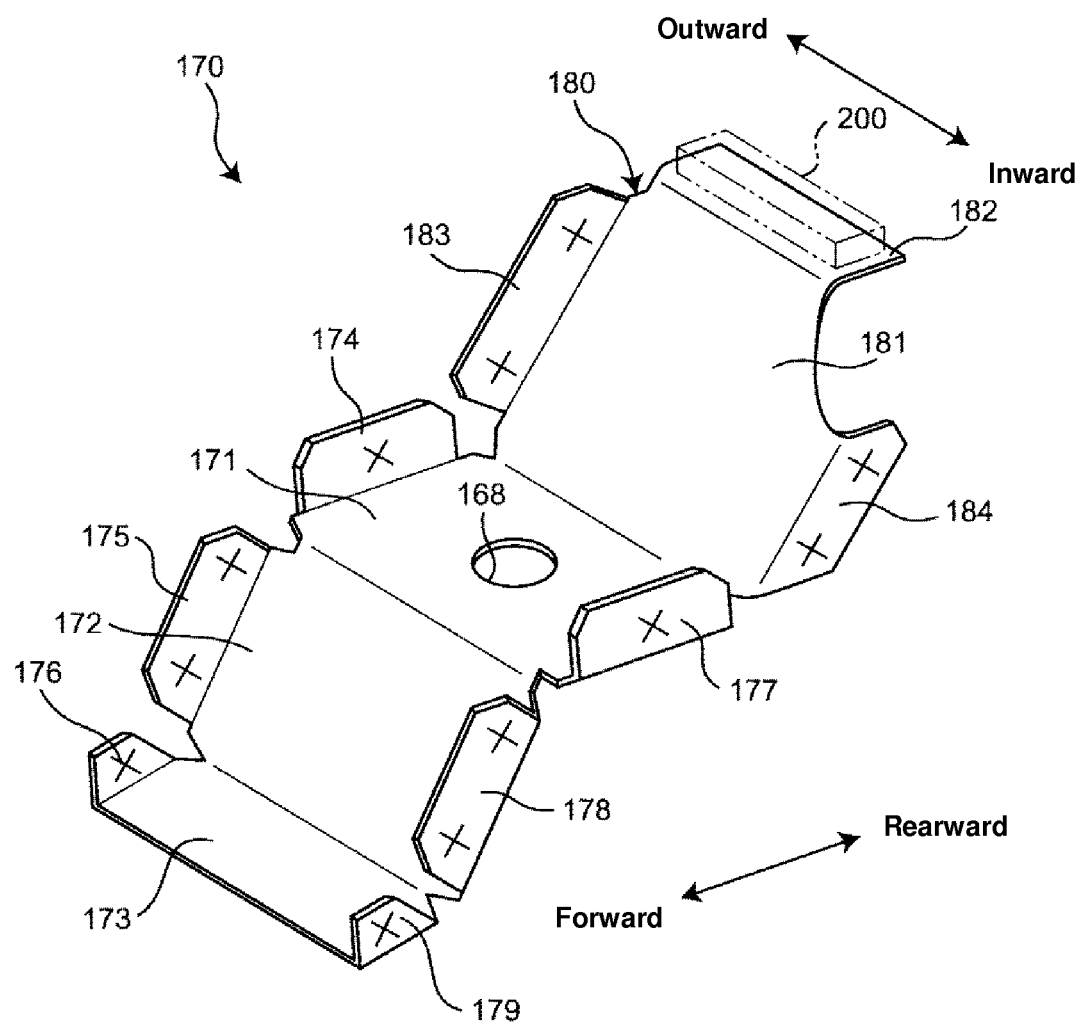
FIG. 11 is a perspective view showing a support member according to the second embodiment.

FIG. 10 is a sectional view of a bolt 192 fixing part of a rear suspension device to a rear side frame 142 and its surrounding structure, taken along line of b-b of FIG. 9, and FIG. 11 is a perspective view showing a support member 170 to support the bolt 192. Herein, while FIGS. 10 and 11 show the structure of the right-side rear side frame 142, the left-side rear side frame has the same structure.

In FIG. 10 in which only a bottom portion 143 of the rear side frame 142 is illustrated, the rear side frame 142 has a U-shaped section which has a pair of right-and-left flanges at its upper end. A rear frame reinforcement 140 is provided above and facing to the bottom portion 143 of the rear side frame 142, and the above-described pair of flanges of the rear side frame 142 are joined to the rear frame reinforcement 140, thereby forming a closed section. The rear frame reinforcement 140 is formed stepwise to rise in front of and near the bolt 192. A pair of front-and-rear flanges of a brace bracket 138 having a U-shaped section is joined to an upper face of the rear frame reinforcement 140 just behind the above-described rising portion.

As shown in FIG. 10, the bolt 192 penetrates the bottom portion 143 of the rear side frame 142 and the rear frame 130 joined to a lower face of the bottom portion 143 from above, and an head portion of the bolt 192 is joined to the support member 170 by welding. The support member 170 is provided between the bottom portion 143 of the rear side frame 142 as the first face portion and the rear frame reinforcement 140 as the second face portion.

As shown in FIGS. 10 and 11, the support member 170 comprises a support portion 171 which is provided above and facing to the rear side frame 142 and supports the bolt 192, a slant portion 172 which extends obliquely forward and downward from a front end of the support portion 171, and a lower joined portion 173 which extends forward from a front end of the slant portion 172 and is joined to an upper face of the rear side frame 142 by welding. A bolt hole 168 for the bolt 192 is formed at a central portion of the support portion 171. Flanges 174, 175, 176, 177, 178 and 179 are respectively formed at both ends of the support portion 171, the slant portion 172 and the lower joined portion 173. These flanges 174-179 are joined to a side face portion of the rear side frame 142 by welding.

In the present embodiment, the support member 170 includes a reinforcing-member portion 180 integrally formed therewith. This reinforcing-member portion 180 comprises a rising portion 181 which rises toward the rear frame reinforcement 140 from a rear end of the support portion 171 and an upper joined portion 182 which extends rearward from an upper end of the rising portion 181 and is joined to a lower face of the rear frame reinforcement 140.

The rising portion 181 slants obliquely rearward and upward. Further, the rising portion 181 has flanges 183, 184 at its both ends in the vehicle width direction. These flanges 183, 184 are joined to a side face portion of the rear side frame 142 by spot welding, respectively. These spot-welding portions constitute the rigid joint portions X having a direct contact.

Meanwhile, the upper joined portion 182 is joined to the lower face of the rear frame reinforcement 140 below a joint portion of the rear flange of the brace bracket 138 to the rear frame reinforcement 140. A joining via a viscoelastic member 200 as a vibration damping member is applied to this joint portion of the upper joined portion 182 to the rear frame reinforcement 140. This joint portion constitutes a flexible joint portion Y.

According to the vehicle-body structure of the second embodiment, since the support member 170 is joined to the lower face of the rear frame reinforcement 140 via the reinforcing-member portion 180, move of the support member 170 is restricted by the rear frame reinforcement 140, so that vibrations of the support member 170 can be effectively restrained.

Further, according to the second embodiment, since the support member 170 is joined not only to the rear frame reinforcement 140 as the second face portion but also to the bottom portion 143 of the rear side frame 142 as the first face portion, the vibrations of the support member 170 can be more effectively restrained.

Moreover, according to the second embodiment, any deformation or collapse of the support member 170 and the rear side frame 142, and the like can be restrained with the above-described rigid joint portions X. Further, vibrations transmitted from the bolt 192 as the suspension forming member to the rear frame reinforcement 140 and the rear side frame 142 via the support member 170 can be reduced with the flexible joint portion Y, thereby restraining the vibration transmission to passengers in the vehicle compartment.

A third embodiment of the present invention will be described referring to FIGS. 12 through 15. Herein, the same members as those of the above-described first and second embodiments are denoted by the same numeral references in FIGS. 12 through 15, descriptions of which are omitted here.

Figure 12:
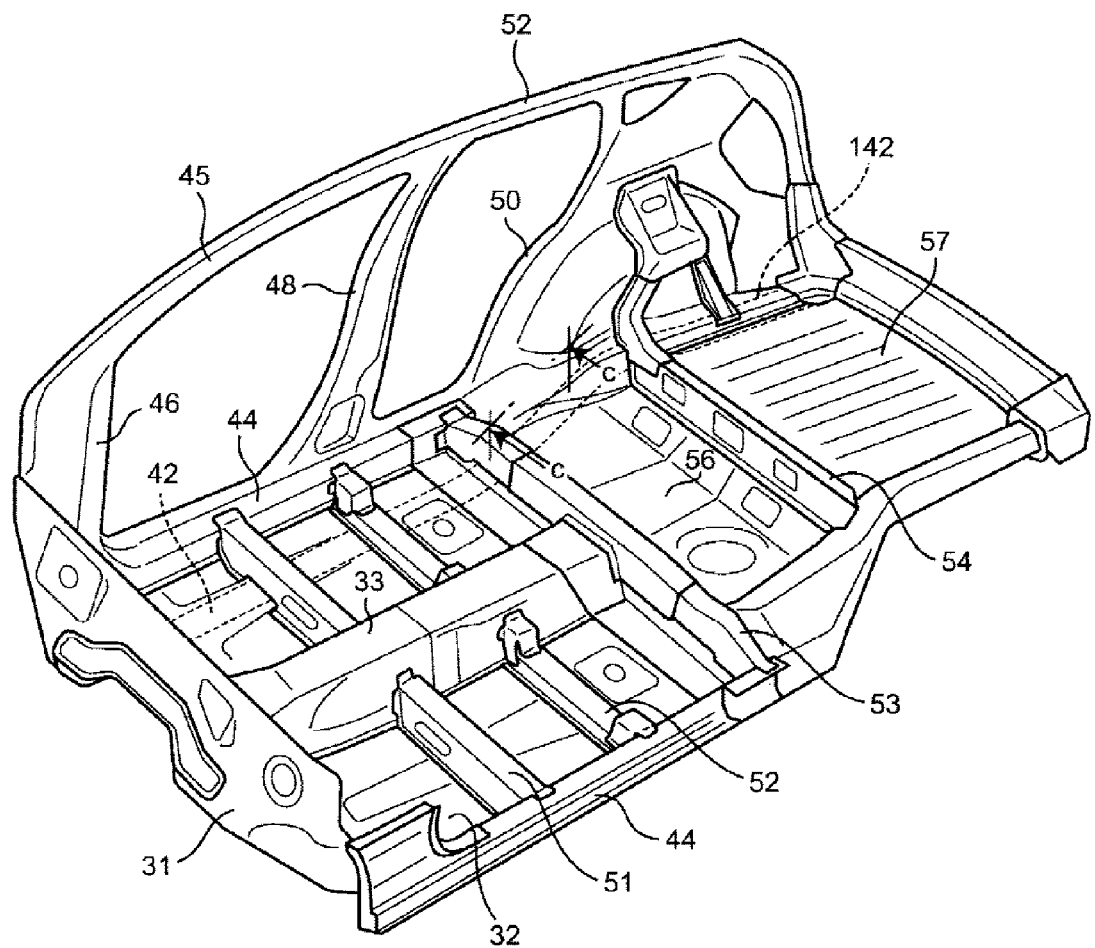
FIG. 12 is a perspective view showing a vehicle body to which a third embodiment of the present invention is applied.
Figure 15:
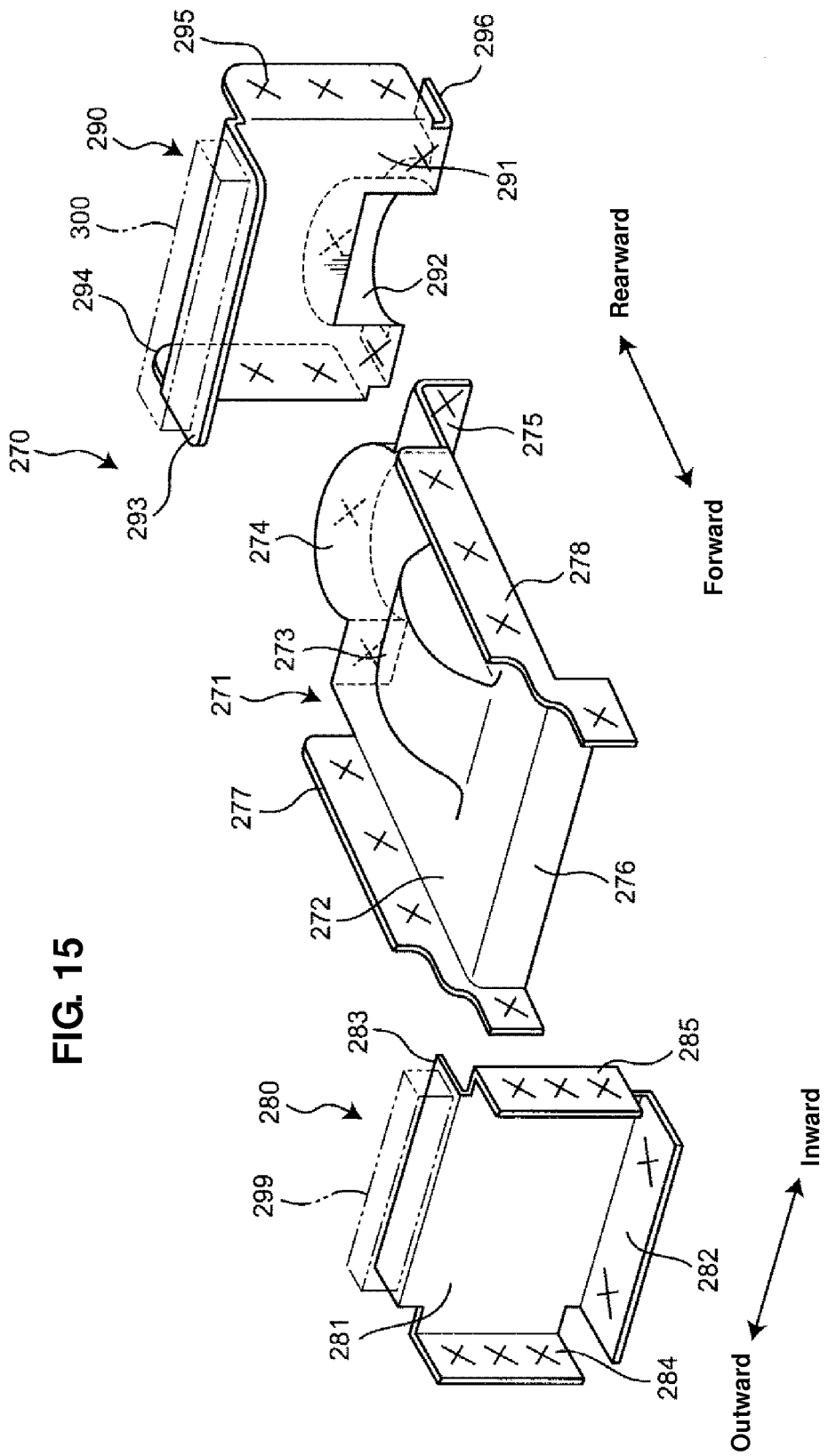
FIG. 15 is a perspective view showing a support member according to the third embodiment.

FIG. 12 shows a structure of the vehicle body to which the third embodiment is applied, FIG. 13 shows a sectional view taken along line c-c of FIG. 12, FIG. 14 is a sectional view taken along line d-d of FIG. 13, and FIG. 15 shows an exploded perspective view of a support member 270 according to the third embodiment.

In the third embodiment, as shown in FIGS. 13 and 14, a structure of an attachment portion of a trailing bracket 210, part of a suspension device of rear wheels, to the rear side frame 142 will be described. Herein, while FIGS. 13 and 14 show the right rear side frame 142, the left rear side frame 142 has the similar structure.

In a portion shown in FIGS. 13 and 14, the rear side frame 142 has a U-shaped section opening downward, and comprises an upper face portion 242 and a pair of side face portions 243, 244 which extends downward from both ends, in the vehicle width direction, of the upper face portion 242. A rear frame reinforcement 240 is provided below and facing to the upper face portion 242 of the rear side frame 142, and lower ends of both-side face portions 243, 244 of the rear side frame 142 are joined to an upper face of the rear frame reinforcement 240. Thereby, a closed section is formed.

As shown in FIG. 13, an opening portion 245 for avoiding with the trailing bracket 210 is formed at the rear frame reinforcement 240. A front end portion of the trailing bracket 210 is inserted into the opening portion 245, whereby the trailing bracket 210 is arranged to penetrate the rear frame reinforcement 240. As shown in FIGS. 13 and 14, a front end portion of the trailing bracket 210 is pivotally supported at an axis 212 which extends in the vehicle width direction above the rear frame reinforcement 240 and below the upper face portion 242 of the rear side frame 142. The axis 212 is provided to extend between a pair of fixing members 214, 215 which is arranged inside the rear side frame 142 with a gap in the vehicle width direction, and the fixing members 214, 215 are fixed to the support member 270.

The support member 270 is provided between the rear frame reinforcement 240 as the first face portion and the upper face portion 242 of the rear side frame 142 as the second face portion. As shown in FIG. 15, the support member 270 comprises a support-member body 171 and first and second connecting members 280, 290 which are connected to the support-member body 271.

The support-member body 271 comprises a support portion 272 which is provided above and facing to the rear frame reinforcement 240 and supports the trailing bracket 210, a front face portion 276 which extends downward from a front end of the support portion 272, and a rear face portion 275 which extends downward from a rear end of the support portion 272. At a central portion of the support portion 272 is provided a protrusion portion 273 which protrudes upward to avoid interference with the front end portion of the trailing bracket 210. Further, a semicircular projection portion 274 which projects rearward is provided at a rear end portion of the support portion 272, and the rear face portion 275 is of a semicircular shape corresponding to an outer peripheral shape of the projection portion 274 in a plan view below the projection portion 274. As shown in FIG. 14, the above-described fixing member 214, 215 are fixed to a lower face of the support portion 272 by bolts 216, 217, for example, on the both sides, in the vehicle width direction, of the protrusion portion 273. Thereby, the support member 270 supports the trailing bracket 210 via the axis fixing members 214, 215 and the axis 212.

Further, a pair of flanges 277, 278 is provided at both-side end portions of the support-member body 271, and the respective flanges 277, 278 are provided to extend upward from the both ends of the support portion 272 and forward from the both ends of the front face portion 276, respectively, and joined to the side face portions 243, 244 of the rear side frame 142 by welding.

The first connecting member 280 comprises a lower joined portion 282 which is joined to the upper face of the rear frame reinforcement 240, a rising portion 281 which rises from a rear end of the lower joined portion 282, and an upper joined portion 283 which extends rearward from an upper end of the rising portion 281.

The upper joined portion 283 is joined to the lower face of the upper face portion 242 of the rear side frame 142, so that the first connecting member 280 functions as the reinforcing member. A joint portion of the upper joined portion 283 to the rear side frame 142 is the one via a viscoelastic member 299 as the vibration damping member, which constitutes a flexible joint portion Y.

Further, a pair of flanges 284, 285 which extends forward is provided at both-side end portions of the rising portion 281 of the first connecting member 280, and the respective flanges 284, 285 are joined to the side face portions 243, 244 of the rear side frame 142 and front end portions of the flanges 277, 278 of the support-member body 271, by spot welding. Moreover, a rear face of the rising portion 281 is joined to the front face portion 276 of the support-member body 271 by spot welding. Thereby, the first connecting member 280 is connected to the support-member body 271. These welding portions constitute rigid joint portions X having a direct contact.

The second connecting member 290 comprises a lower joined portion 296 which is joined to the upper face of the rear frame reinforcement 240, a rising portion 291 which rises from a front end of the lower joined portion 296, and an upper joined portion 293 which extends forward from an upper end of the rising portion 291.

The upper joined portion 293 is joined to the lower face of the upper face portion 242 of the rear side frame 142, so that the second connecting member 290 functions as the reinforcing member. A joint portion of the upper joined portion 283 to the rear side frame 142 is the one via a viscoelastic member 300 as the vibration damping member, which constitutes a flexible joint portion Y.

Further, a pair of flanges 294, 295 which extends forward is provided at both-side end portions of the rising portion 291 of the second connecting member 290, and the respective flanges 294, 295 are joined to the side face portions 243, 244 of the rear side frame 142 by spot welding. Moreover, a semicircular recess portion 292 which is recessed rearward is formed at a lower portion of the rising portion 291, which corresponds to the shape of the projection portion 274 of the support-member body 271. This second connecting member 290 is joined to the support-member body 271 by joining a rear face of the rear face portion 271 to a front face of the rising portion 291 by spot wielding in a state in which the projection portion 274 of the support-member body 271 engages with the recess portion 292.

According to the vehicle-body structure of the third embodiment, since the support member 270 is joined to the upper face portion 242 of the rear side frame 142 via the first and second connecting members 280, 290, move of the support member 270 is restricted by the rear side frame 142, so that vibrations of the support member 270 can be effectively restrained.

Further, according to the third embodiment, since the support member 270 is joined not only to the upper face portion 242 of the rear side frame 142 as the second face portion but also to the frame reinforcement 240 as the first face portion, the vibrations of the support member 270 can be more effectively restrained.

Moreover, according to the third embodiment, any deformation or collapse of the support member 270 and the rear side frame 142, and the like can be restrained with the above-described rigid joint portions X. Further, vibrations transmitted from the trailing bracket 210 as the suspension forming member to the rear side frame 142 via the support member 270 can be reduced with the flexible joint portions Y, thereby restraining the vibration transmission to passengers in the vehicle compartment.

A fourth embodiment of the present invention will be described referring to FIGS. 16 through 19. Herein, the same members as those of the above-described first, second and third embodiments are denoted by the same numeral references in FIGS. 16 through 19, descriptions of which are omitted here.

Figure 16:
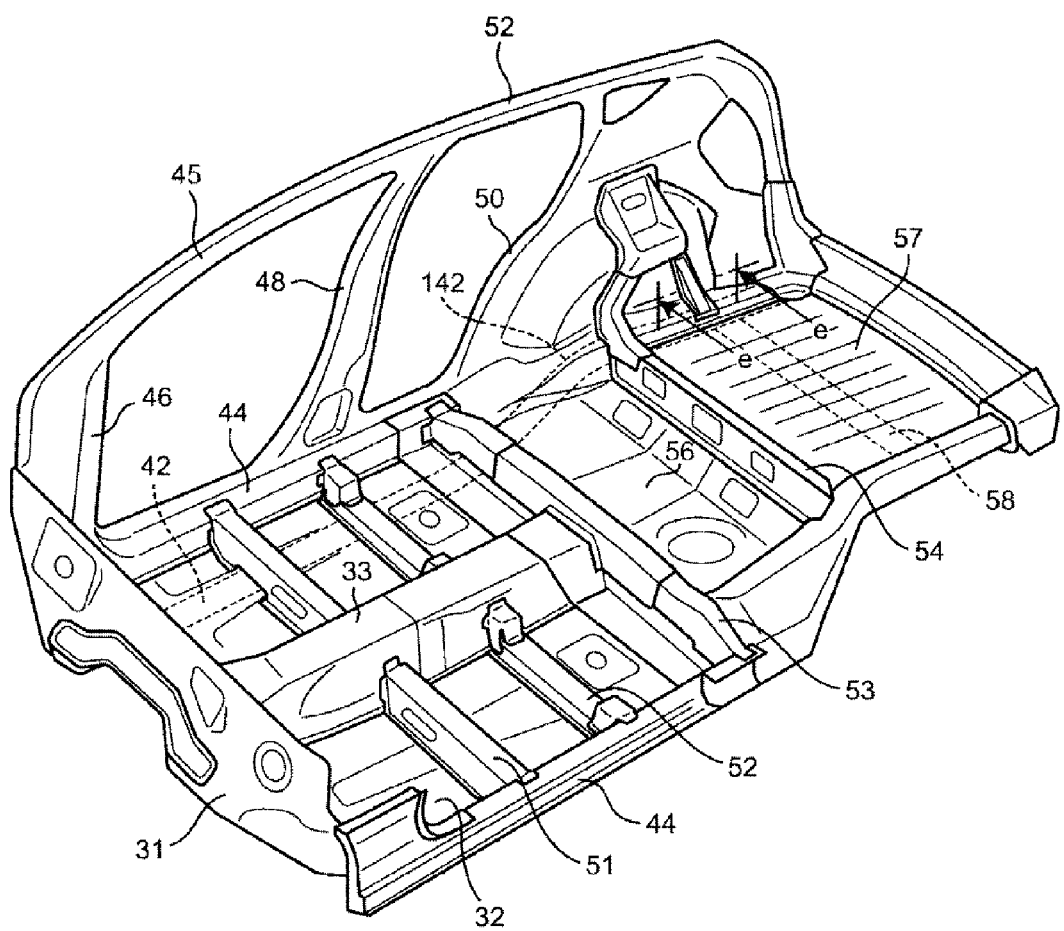
FIG. 16 is a perspective view showing a vehicle body to which a fourth embodiment of the present invention is applied.

FIG. 16 shows a structure of the vehicle body to which the fourth embodiment is applied. As shown in FIG. 16, a No. 4.5 cross member 58 is provided in back of the No. 4 cross member 54 to extend in the vehicle width direction between the right and left rear side frames 142 at a rear portion of the vehicle body.

Figure 17:
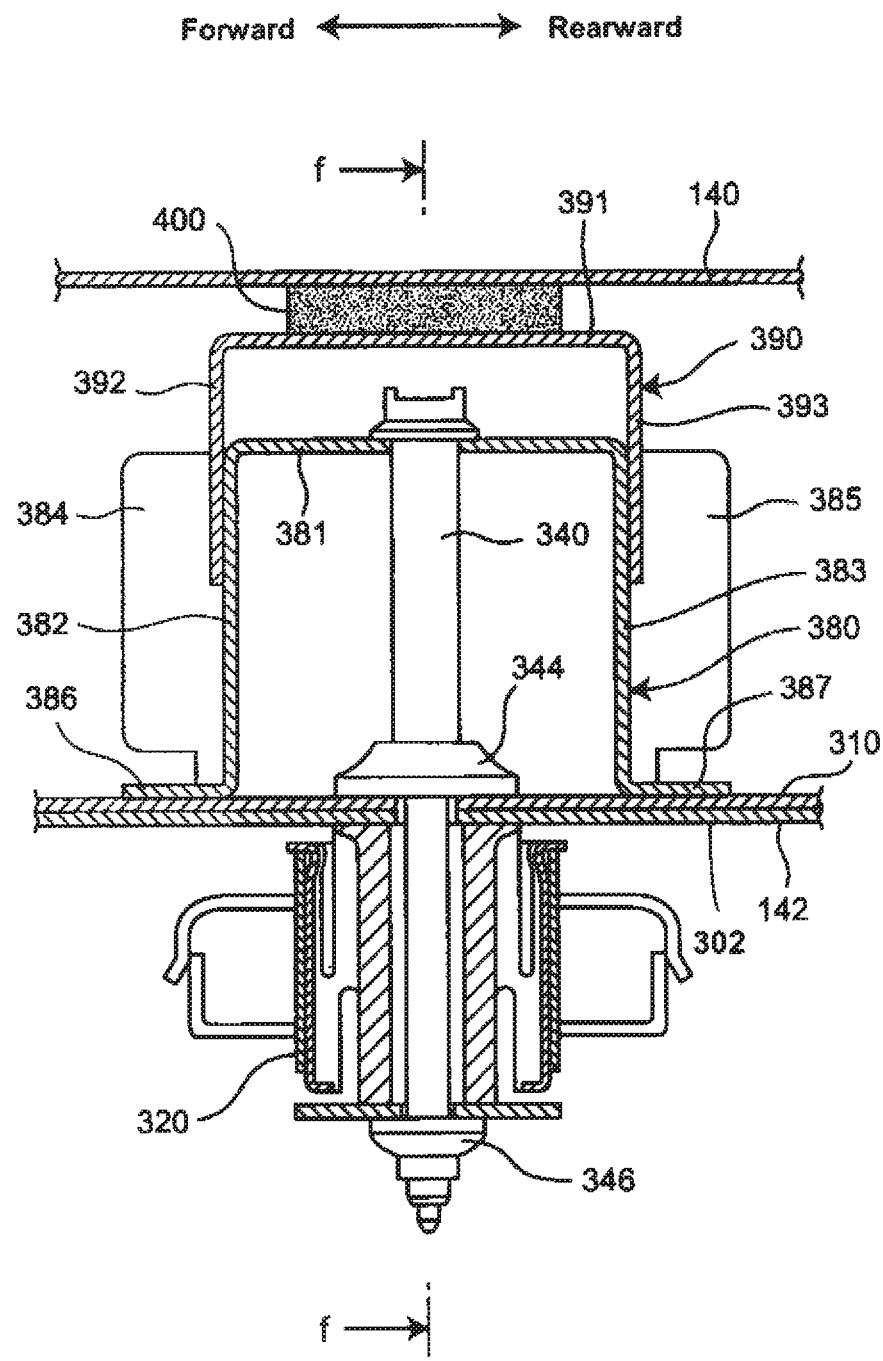
FIG. 17 is a sectional view of the vehicle-body structure according to the fourth embodiment taken along line e-e of FIG. 16.
Figure 18:
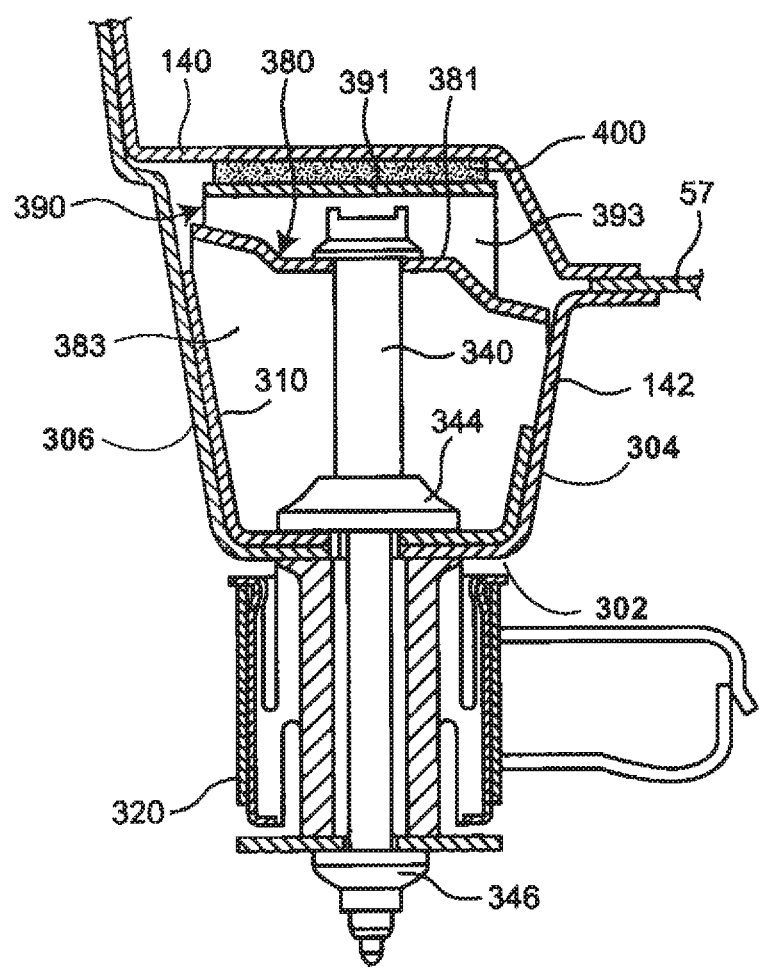
FIG. 18 is a sectional view of the vehicle-body structure according to the fourth embodiment taken along line f-f of FIG. 17.

FIG. 17 shows a sectional view taken along line e-e of FIG. 16, FIG. 18 shows a sectional view taken along line f-f of FIG.

Figure 19:
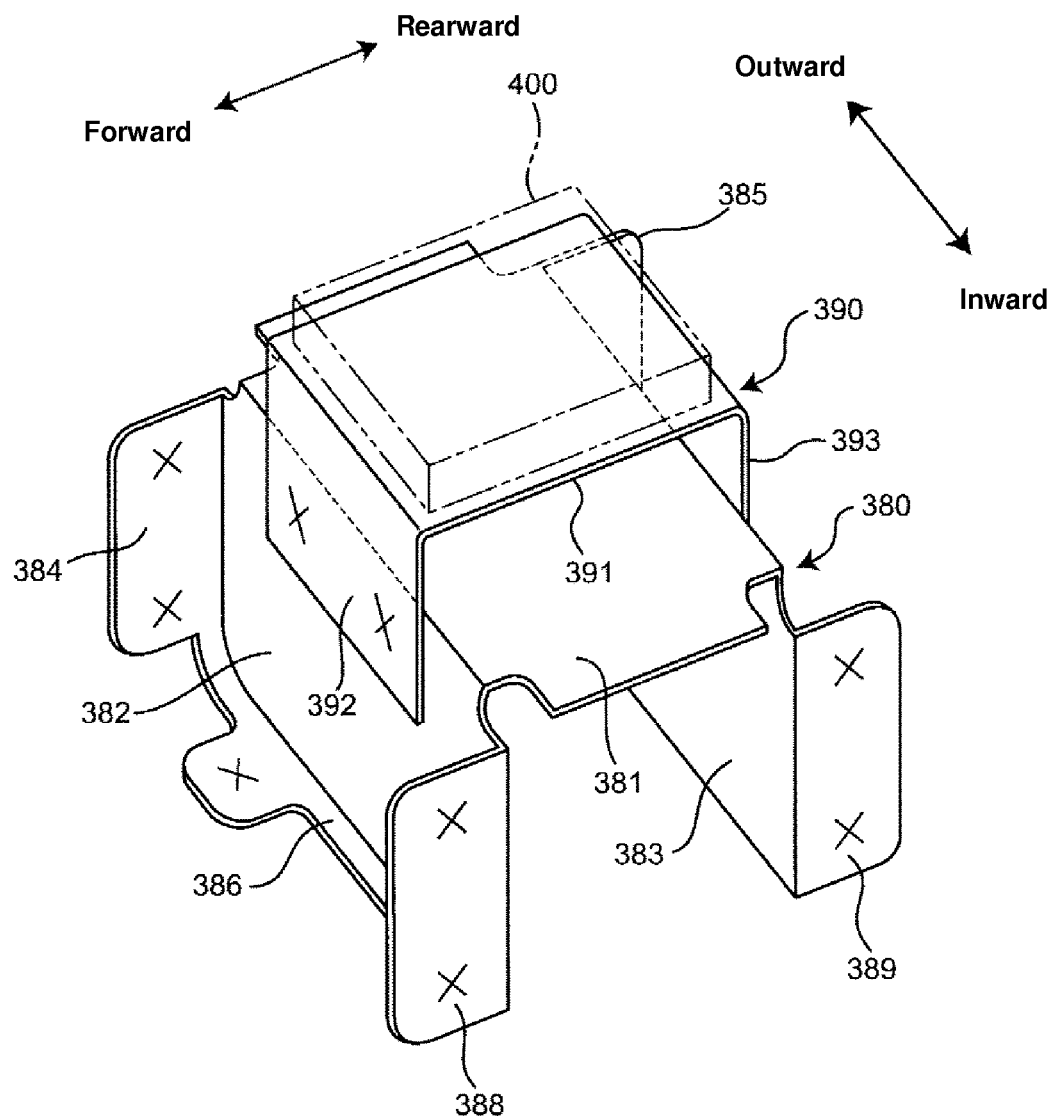
FIG. 19 is a perspective view showing a support member and a reinforcing member according to the fourth embodiment.

17, and FIG. 19 shows a perspective view of a support member 380 and a reinforcing member 390 according to the fourth embodiment.

In the fourth embodiment, as shown in FIGS. 17 and 18, a structure of an attachment portion of a member bracket 320 for attaching part of the rear suspension device to the rear side frame 142 will be described. Herein, while FIGS. 17 and 18 show a structure of the right-side rear side frame 142, the left-side rear side frame 142 has the same structure.

In a portion shown in FIGS. 17 and 18, the rear side frame 142 has a U-shaped section opening upward, and comprises a bottom face portion 302 and a pair of side face portions 304, 306 which rises from both ends, in the vehicle width direction, of the bottom face portion 302. Herein, a reinforcing member 310 is overlapped and joined to an upper face of the bottom face portion 302 of the rear side frame 142.

The rear frame reinforcement 140 is provided above and facing to the bottom face portion 302 of the rear side frame 142, and upper ends of both-side face portions 304, 306 of the rear side frame 142 are joined to a lower face of the rear frame reinforcement 140. Thereby, a closed section is formed.

The member bracket 320 is fixed to a lower face of the bottom face portion 302 of the rear side frame 142 by a bolt 340. This bolt 340 penetrates the bottom face portion 302 of the rear side frame 142 and the member bracket 320, and is fastened with an upper nut 344 which is placed onto an upper face of the reinforcing member 310 and a lower nut 346 which is placed onto a lower face of the member bracket 320. Further, a head portion of the bolt 340 is supported by the above-described support member 380.

As shown in FIG. 19, the support member 380 comprises a support portion 381 which is provided between the bottom face portion 302 of the rear side frame 142 as the first face portion and the rear frame reinforcement 140 as the second face portion, a front face portion 382 which extends downward from a front end of the support portion 381, and a rear face portion 383 which extends downward from a rear end of the support portion 381.

Further, a pair of flanges 384, 388 which extends forward is provided at both-side end portions of the front face portion 282, and the respective flanges 384, 388 are joined to the side face portions 304, 306 of the rear side frame 142 by spot welding. Moreover, a flange 386 extending forward is formed at a lower end of the front face portion 382, and this flange 386 is joined to an upper face of the above-described reinforcing member 310 by spot welding.

Meanwhile, a pair of flanges 385, 389 which extends rearward is provided at both-side end portions of the rear face portion 283, and the respective flanges 385, 389 are joined to the side face portions 304, 306 of the rear side frame 142 by spot welding. Also, a flange 387 (see FIG. 17) which extends rearward is formed at a lower end of the rear face portion 383, and this flange 387 is joined to an upper face of the above-described reinforcing member 310 by spot welding.

This support member 380 is joined to the rear frame reinforcement 140 as the second face portion via the above-described reinforcing member 390. The reinforcing member 390 comprises a joined portion 391 which is joined to a lower face of the rear frame reinforcement 140, a front face portion 392 which extends downward from a front end of the joined portion 391, and a rear face portion 393 which extends downward from a rear end of the joined portion 391. Thus, this reinforcing member 390 is formed in a U shape in a side view as a whole. The reinforcing member 390 is joined to the support member 380 such that the joined portion 391 is located above the support portion 381 of the support member 380 with a specified distance.

Specifically, the front face portion 392 of the reinforcing member 390 is joined to a front face of the front face portion 382 of the support member 380 and the rear face portion 393 of the reinforcing member 390 is joined to a rear face of the rear face portion 383 of the support member 380, respectively, by spot welding. These joint portions constitute rigid joint portions X.

Meanwhile, the joined portion 391 of the reinforcing member 390 and the rear frame reinforcement 140 are joined together via a viscoelastic member 400 as the vibration damping member, which constitutes a flexible joint portion Y.

According to the vehicle-body structure of the fourth embodiment, since the support member 380 is joined to the rear frame reinforcement 140 via the reinforcing member 390, move of the support member 380 is restricted by the rear frame reinforcement 140, so that vibrations of the support member 380 can be effectively restrained.

Further, according to the fourth embodiment, since the support member 380 is joined not only to the rear frame reinforcement 140 as the second face portion but also to the bottom face portion 302 of the rear aide frame 142 as the first face portion, the vibrations of the support member 380 can be more effectively restrained.

Moreover, according to the fourth embodiment, any deformation or collapse of the support member 380, the reinforcing member 390, and the rear side frame 142, and the like can be restrained with the above-described rigid joint portions X. Further, vibrations transmitted from the bolt 340 as the suspension forming member to the rear frame reinforcement 140 and the rear side frame 142 via the support member 280 and the reinforcing member 390 can be reduced with the flexible joint portion Y, thereby restraining the vibration transmission to passengers in the vehicle compartment.

The present invention should not be limited to the above-described embodiments.

For example, while the above-described embodiments describe the case in which the rigid joint portion is constituted by the welding, the present invention is not limited to this welding joint, but any other joint manner, such as bolt-nut fastening, may be used.

Further, while the above-described embodiments describe the case in which the flexible joint portion Y is applied only to the joint portion of the reinforcing member to the second face portion, it may be applied to any other joint portions than this.

Moreover, while either the rigid joint portion X or the flexible joint portion Y is applied to respective joint portions of the reinforcing member to the other members, both the rigid joint portion X and the flexible joint portion Y may be applied to a single joint portion.

What is claimed is:

1. A vehicle-body structure of a vehicle, where a suspension forming member is attached to a vehicle body; comprising:
a first face portion, which the suspension forming member penetrates;
a second face portion provided to face the first face portion; and
a support member provided between the first face portion and the second face portion via a reinforcing member which is formed integrally with the support member or formed separately from the support member, and
a joint portion of said reinforcing member and another member than the reinforcing member includes a rigid joint portion where the reinforcing member and another member are joined with a direct contact thereof and a flexible joint portion where the reinforcing member and another member are joined via a damping member provided therebetween.

2. The vehicle-body structure of a vehicle of claim 1, wherein said flexible joint portion is provided at a joint portion of said reinforcing member and said second face portion.

3. The vehicle-body structure of a vehicle of claim 2, wherein said damping member is a viscoelastic member having physical properties which fall within a range enclosed by six coordinate points: (1, 0.4), (1, 0.2), (2, 0.1), (1000, 0.1), (10000, 0.2) and (10000, 0.4) in an X-Y coordinate system with X axis of the storage modulus and Y axis of the loss factor, or a range exceeding the loss factor of 0.4.

* * * * *